United States Patent [19]
Mickelson

[11] 3,829,034
[45] Aug. 13, 1974

[54] REEL SPINDLE FOR MULTIPLE WIDTH REELS

[75] Inventor: Maurice G. Mickelson, Minneapolis, Minn.

[73] Assignee: Pako Corporation, Minneapolis, Minn.

[22] Filed: Mar. 16, 1973

[21] Appl. No.: 341,965

[52] U.S. Cl. .................... 242/68.3, 287/3, 287/261
[51] Int. Cl. .................... B65h 17/02
[58] Field of Search .......... 242/68.3, 68.1, 68.2, 68, 242/129.7, 129.71, 129.72, 129.5, 130, 71, 71.1, 46.2, 55.2, 55.3, 55.42, 55.53, 55.54, 55.55, 56.9, 180; 403/3, 93, 328, 327, 247, 256, 261; 197/175

[56] References Cited

UNITED STATES PATENTS

| | | | |
|---|---|---|---|
| 1,957,884 | 5/1934 | Green | 242/68.3 |
| 2,657,866 | 11/1953 | Lungstrom | 242/68.3 X |
| 2,663,509 | 12/1953 | Hinchman | 242/68.3 X |
| 3,326,489 | 6/1967 | Lessler | 242/68.3 |

*Primary Examiner*—John W. Huckert
*Assistant Examiner*—John M. Jillions

[57] ABSTRACT

This is a reel spindle specifically constructed to accommodate reels of different widths while maintaining the same center line for the reels. This is accomplished by means of a multiple jointed spindle in combination with a spring pressed centering pin.

3 Claims, 5 Drawing Figures

REEL SPINDLE FOR MULTIPLE WIDTH REELS

Rolls of film and tape are provided in a number of different widths. For example, in photographic film it is common to have 16mm width film and also 35mm width film. A number of different reel spindles have been designed in the past which are adapted to accommodate different width reels and film. However, these for the most part have been complicated and expensive to manufacture.

It is an object of the present invention to provide an extremely simple yet effective reel spindle specifically constructed to permit different width reels to be mounted thereon while maintaining a constant center line relationship for the film or tape on the reel.

More specifically it is an object to provide a multiple jointed reel spindle for engaging the outer side of the reel and a spring pressed pin for maintaining the positioning engagement of the reel against the outer retaining means.

Still more specifically it is an object to provide a multiple jointed reel spindle for film or tape in which each joint provides a pivoted retaining and positioning mounting for a section of the spindle and the location of the pivot positively positions one side of a reel mounted on said spindle and a suitable pressure applying member holds the reel against the retaining and positioning spindle segment whereby a constant center line is maintained regardless of the width of the reel mounted on said spindle.

These and other objects and advantages of this invention will more fully appear in the following description made in connection with the accompanying drawings in which like reference characters refer to similar parts throughout the several views, and, in which.

Figures 1, 2, 3, 4, 5:
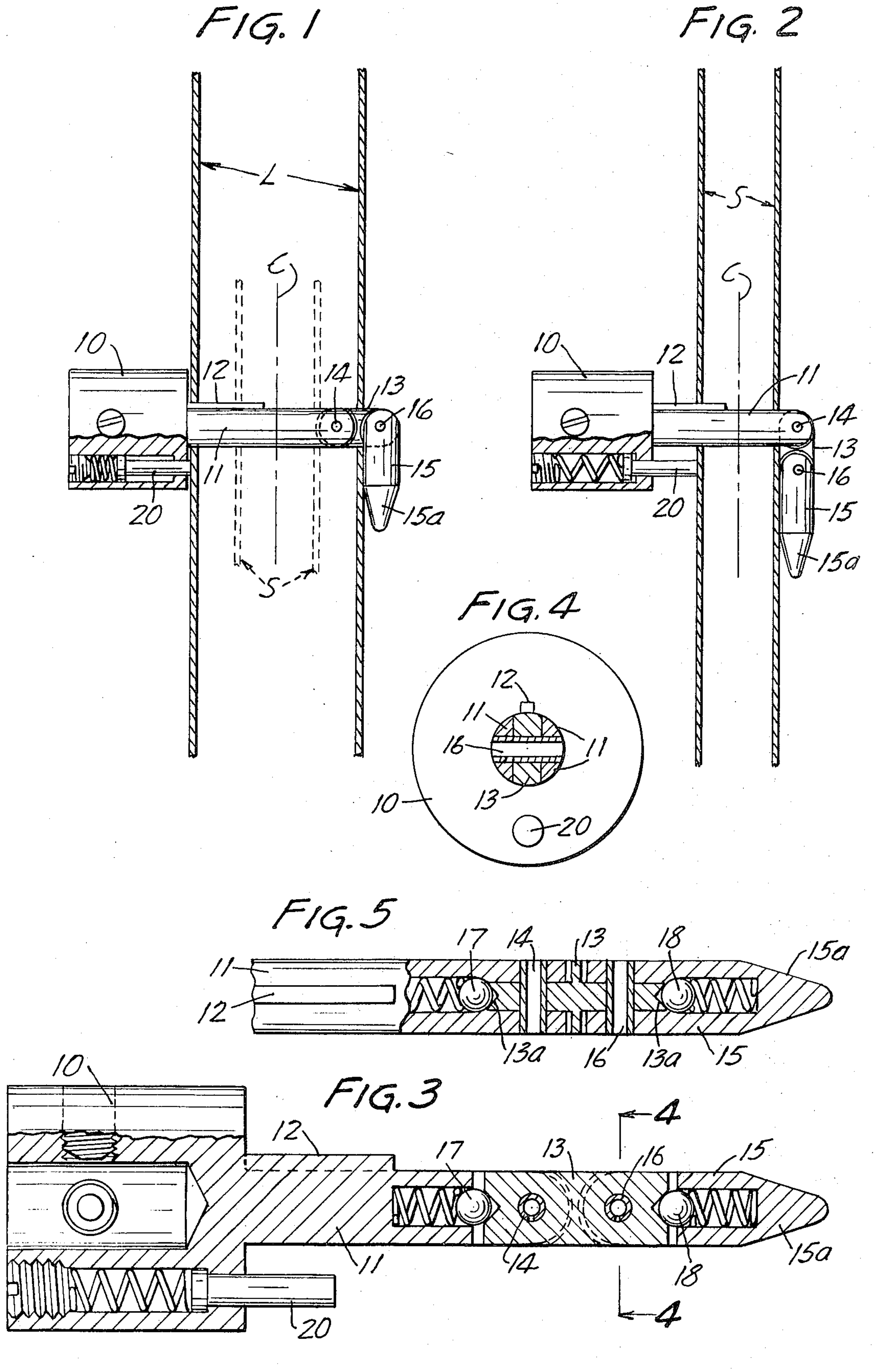
FIG. 1 is a vertical section of my spindle showing a wide reel mounted thereon.
FIG. 2 is a similar view of my spindle showing a narrow reel mounted thereon.
FIG. 3 is a view partially in section showing the construction of the spindle.
FIG. 4 is a transverse section taken substantially on the line 4—4 of FIG. 3, and, FIG. 5 is a fragmentary view partially in section taken at right angles to the section plane of FIG. 3.

A reel spindle embodying my invention is illustrated in the accompanying drawings and has a mounting hub 10 capable of being driven by any suitable means such as a drive shaft (not shown). A first spindle section 11 is fixed in outstanding axial alignment with the hub 10 and a driving key 12 is fixed along one side thereof.

A second spindle segment 13 is pivotally mounted at the other end of first segment 11 as by a transverse pivot pin 14. A third spindle segment 15 is in turn pivotally connected to the outer end of the second segment 13 by a second transverse pivot pin 16. In the form shown only the three spindle segments 11, 13 and 15 are illustrated. However, it is obvious that any desired number of such segments could be provided depending upon the number of different width spindles are to be accommodated.

The outer segment 15 has a tapered outer end portion 15a to facilitate initial insertion through the central opening in the reel.

Spring pressed balls 17 and 18 are respectively mounted in the spindle segments 11 and 15 and are designed to maintain the segments in the desired pivotal position. A notch may be provided to receive these spring pressed balls such as the notches 13a and 13b at opposite ends of the second segment 13.

A spring pressed centering member such as the pin 20 is mounted in the hub 10 and is offset from the axis of spindle 11 to engage one side of a reel mounted on said spindle and resiliently hold the same against the retaining segment of the spindle. A large size reel L is illustrated in FIG. 1 and the outer spindle segment 15 is swung down into retaining position for engagement with the outer surface of flange of reel L and position the center line of the reel at the location identified by the letter C in FIG. 1. The spring pressed pin 20 engages the inner flange of the reels and holds the reel in centering relationship against the outer segment 15 as illustrated.

FIG. 2 shows the same strip center line C but illustrates a small width reel S mounted on the spindle and the intermediate or second spindle section 13 is pivoted into retaining and centering position with the outer segment 15 axially aligned therewith. The spring pressed pin 20 is shown in extended position to maintain centering contact between the outer reel flange and the retaining pin segments 13 and 15 which are axially aligned with each other but are transverse to the axis of spindle segment 11. The key 12 is sufficiently long to be received in a standard notch provided in the spindle receiving aperture in both reels S and L.

It will be seen that this invention provides a film or tape receiving reel spindle which will accommodate reels of different widths while maintaining a constant center line relationship. The spring pressed balls 17 and 18 maintain the spindle segments 13 and 15 in their desired respective relationships.

It will, of course, be understood that various changes may be made in the form, details, arrangement and proportions of the parts without departing from the scope of this invention as set forth in the appended claims.

What is claimed is:

1. A reel spindle particularly adapted to accommodate reels of different widths while maintaining the same center line thereof, said spindle comprising
a mounting hub adapted to be rotated,
a first spindle section fixed in axially aligned relation to said hub,
means for maintaining driving engagement with a reel mounted on said spindle,
at least two spindle sections pivotally connected to said first section with releasable means for maintaining the same in axial alignment with said first section but permitting either of said sections to be pivoted into a retaining position disposed at substantially right angles to the axis of said first spindle section and in this position to engage and retain a reel on said spindle, the outer section being disposed in retaining position for reels of greater width and the inner spindle section being disposed in retaining position for reels of lesser width, and
yieldable means for engaging the reel on the opposite side thereof from the retaining spindle element to maintain contact between the reel and said spindle element,
the difference between the effective length of said pivoted spindle sections being equal to one-half the difference between the width of the reels to be mounted thereon to maintain a common center line location for different width reels.

2. The structure set forth in claim 1 and said releasable means comprising spring pressed elements mounted in one section and engaging the end portion of the next adjacent pivoted section to maintain axial alignment thereof and also engaging the side portion of said pivoted section to maintain the pivoted section in the desired retaining position.

3. The structure set forth in claim 1 and said yieldable means comprising a spring pressed pin member mounted on said hub and urged outwardly therefrom into engagement with the side portion of a reel flange mounted on said spindle.

* * * * *